(No Model.)
H. S. BLACKMORE.
PROCESS OF PURIFYING WATER GAS.
No. 470,974. Patented Mar. 15, 1892.
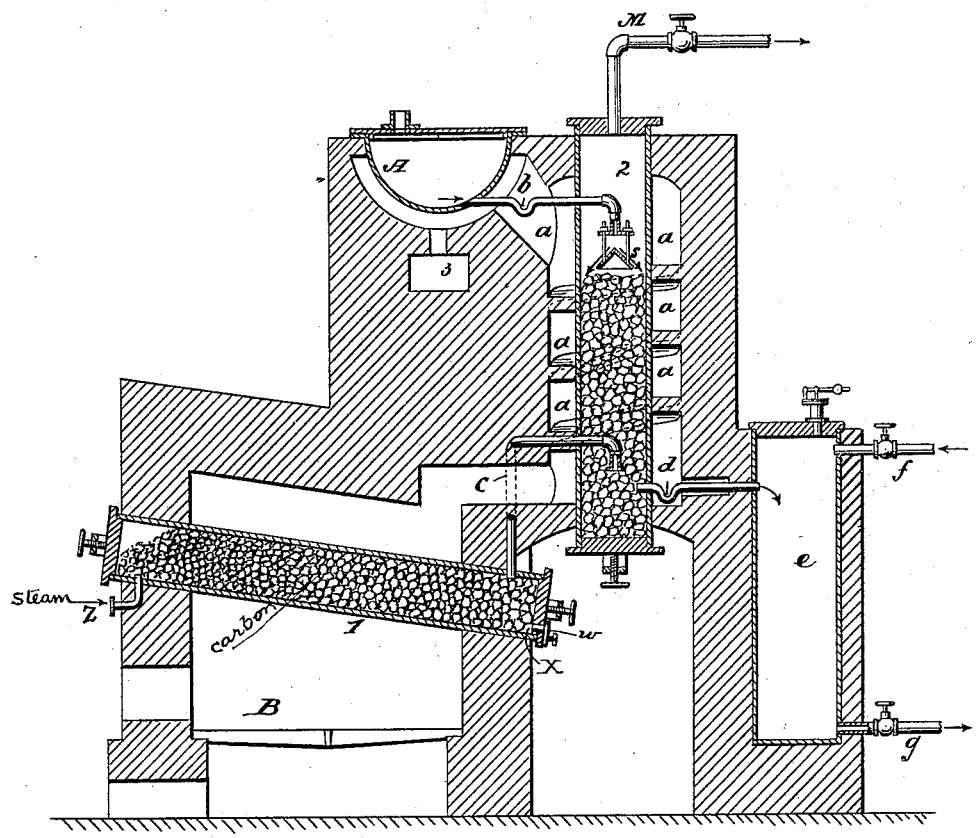
WITNESSES:
Edward Wolff
William Miller
INVENTOR:
Henry S. Blackmore.
BY
VanSantvoord & Hauff
his ATTORNEYS

UNITED STATES PATENT OFFICE.

HENRY S. BLACKMORE, OF MOUNT VERNON, NEW YORK.

PROCESS OF PURIFYING WATER-GAS.

SPECIFICATION forming part of Letters Patent No. 470,974, dated March 15, 1892.

Application filed April 25, 1891. Serial No. 390,509. (No model.)

*To all whom it may concern:*

Be it known that I, HENRY S. BLACKMORE, a citizen of the United States, residing at Mount Vernon, county of Westchester, State of New York, have invented new and useful Improvements in Processes of Purifying Water-Gas, of which the following is a specification.

The object of my invention is to eliminate from water-gas the poisonous carbonic oxide; and my invention consists in exposing water-gas or a mixture of carbonic oxide and hydrogen to the action of a caustic alkali heated to fusion.

In all processes hitherto devised for the production of water-gas, which consist in passing steam over and through heated oil, incandescent carbon, &c., there has been no practical method of separating the poisonous carbonic oxide from the product, which therefore consists of a mixture of hydrogen and carbonic oxide, and as it is important to have the gases which are used for illuminating purposes free from carbonic oxide on account of its poisonous properties it is obvious that the presence of such oxide has been a great drawback in the utilization of water-gas. Not only has it been a drawback in connection with mortality, but also at times in the success of certain burners dependent upon heating certain earths to an incandescent state for illuminating purposes by depositing upon the earthy films a coating of fine carbon, or perhaps producing carbides with the earthy bases, which cause the burners to become dull and comparatively useless in their illuminating power.

In the production of water-gas by passing steam over and through incandescent carbons theoretically sixty (60) pounds of water in the form of steam when brought in immediate contact with forty (40) pounds of carbon should be decomposed, producing about twelve hundred and forty-nine cubic feet of hydrogen and twelve hundred and fifty-two cubic feet of poisonous carbonic oxide.

My method of eliminating the carbonic oxide from the mixture above stated consists in exposing said mixture to the action of a caustic alkali in a state of fusion. For this purpose I prefer to place the caustic alkali in a caldron A, (see the accompanying drawing, consisting of one figure, which I hereby make part of my specification,) in which the alkali is melted or fused by the heat generated in the fire-box of the furnace B, the products of combustion from the furnace after heating the contents of the retort 1 being conducted upward by the spiral flue $a$, around the vertical retort 2, thence to and under the caldron A, and thence through flue 3 to the chimney. (Not shown.) As the alkali in caldron A becomes fused, it gradually passes through the trap $b$ into the top of retort 2, where it falls upon the conical deflector S, by which the fused alkali is thrown toward the sides of the retort. The said retort 2 is filled with blocks or pieces of material, which will not combine with or act upon the alkali—such, for example, as magnesia, burned dolomite, &c.—the object being to have the fused alkali trickle down upon and over the said material, and thus be spread over a large surface, so as to expose it as much as possible to the action of the gas which is generated in the retort 1, and which is conducted from that retort into retort 2 by means of pipe $c$. The gas which is thus introduced into retort 2 from the retort 1 will ascend through the crevices and openings between the pieces of the material and will be brought into close contact with the fused salt that trickles down from the conical deflector S. The lower part of the retort 2 is hotter than the upper part, as it is nearest the fire, and the upper part of the retort being therefore the coolest the gas in the upper part is readily absorbed by the portion of the alkali with which it comes in contact, thus producing a formate of the alkali used. As this fused salt descends in retort 2, being mixed with more or less caustic alkali, which has not been acted upon into the hotter parts of the retort, they react upon each other, producing free hydrogen and generating a carbonate of the alkali used, which, being in a fused state, escapes through the trap $d$ into the reservoir $e$, where it is finally washed out by admitting water and steam through the pipe *f*, controlled by a suitable valve, the saturated solution thus produced being drawn off through pipe *g* upon opening the valve connected therewith and treating with slaked lime to reconvert it into a caustic alkali for further operation.

It is obvious that the water-gas may be produced by any method, and the apparatus for purifying it by my process may be connected to a gas-generating furnace in any convenient manner. In cases where the gas is produced in a cupola by first forcing air through the carbon and then the steam, it is obvious that an independent fire-box for the purifying apparatus would be necessary, or the purifier might be heated by means of gas in any convenient way. The method shown in the accompanying drawings consist in heating by external means the retort 1, which is charged with charcoal or carbon. When the retort is heated to a proper temperature, steam is admitted through the pipe Z, which steam, passing over or through the incandescent carbon, is decomposed, the gases passing through the pipe *c* into the purifying-retort 2, and thence through pipe M to the exhauster and tank. (Not shown.) Any slag produced from the decomposed carbon is drawn off at X by drawing the plug *w*.

Fusing an alkali in a retort and passing the gases through the fused salt or compound, thus washing the carbonic oxide out of the hydrogen gas, and then raising the temperature and generating hydrogen is substantially the same as herein described—namely, the separation of carbonic oxide from water-gas, which consists in bringing the gas in contact with a fused alkali or its equivalent and bringing the alkaline salts to a higher temperature and producing hydrogen and a carbonate.

The purifying retort is preferably made of iron.

It is obvious that in carrying out my invention a mixture of alkalies—such as soda and potash, for example—may be used instead of using either of them alone, and the same are mixed in such proportions as to produce the most fusible compound.

Taking it for granted that I have twelve hundred and forty-nine cubic feet of hydrogen contaminated with twelve hundred and fifty-two cubic feet of carbonic oxide, my process consists in first bringing this mixture in contact with a caustic alkali, such as potash or soda—preferably the latter on account of its cheapness—in a fused or volatile state. The fused or volatile caustic alkali—say, for instance, caustic soda (NaOH)—reacts with the carbonic oxide, producing sodium formate, thus:

$$H_2 + CO + NaOH = HCO_2Na + H_2,$$

leaving the hydrogen free from carbonic oxide. The twelve hundred and fifty-two cubic feet of carbonic oxide produce about two hundred and twenty-seven pounds of sodium formate and absorb about one hundred and thirty-four pounds of caustic soda. If the process stopped here, it would undoubtedly prove a costly operation; but as the sodium formate itself is decomposed at a little higher temperature in contact with the excess of caustic soda, producing an alkaline carbonate and setting free pure hydrogen, thus:

$$HCO_2Na + NaOH = Na_2CO_3 + H_2,$$

it is seen that finally I recover hydrogen for the extracted carbonic oxide. The alkaline carbonate finally produced is reconverted into a caustic state by treating the same with slaked lime (calcium hydroxide) and used over again.

A mixture of twelve hundred and forty-nine cubic feet of hydrogen contaminated with twelve hundred and fifty-two cubic feet of carbonic oxide when brought into immediate contact with one hundred and thirty-four pounds of caustic soda in a fused or volatile state produces two hundred and twenty-seven pounds of sodium formate, leaving twelve hundred and forty-nine cubic feet of pure hydrogen gas, two hundred and twenty-seven pounds of sodium formate thus produced being in contact with one hundred and thirty-four pounds more of caustic soda as the temperature is raised produce about three hundred and fifty-four pounds of sodium carbonate, which is reconverted into a caustic state by milk of lime, and twelve hundred and twenty-five cubic feet of pure hydrogen gas, making a total of hydrogen of two thousand four hundred and seventy-five cubic feet. It is therefore seen that sixty pounds of water in the form of steam passed over and through heated carbon and washed or brought in contact with two hundred and sixty-eight pounds of fused or volatile caustic soda produce three hundred and fifty-four pounds of sodium carbonate and two thousand four hundred and seventy-five cubic feet of free hydrogen gas. Thus it is seen that nearly twice the quantity of free hydrogen gas is obtained by thus separating the carbonic oxide. Practically two hundred and sixty-eight pounds of caustic alkali is placed in the purifying apparatus and fused when the impure water-gas is brought in contact with it and allowed to pass through until the gasometer registers twelve hundred and fifty cubic feet, when the gas is shut off and the temperature of the purifying apparatus raised, when about twelve hundred and twenty-five more cubic feet of hydrogen are generated, leaving about three hundred and fifty-four pounds of sodium carbonate in the apparatus, which is more or less contaminated with sodium formate and hydroxide. If the temperature is kept high throughout the operation, a large quantity of caustic alkali may be charged in the apparatus and the gas made to circulate continuously until the caustic alkali is thoroughly carbonated, when it is taken out and reconverted into caustic alkali for further operation.

What I claim as new, and desire to secure by Letters Patent, is—

The process of eliminating carbonic oxide from water-gas or a mixture of carbonic oxide and hydrogen, which consists in passing said mixture over and through caustic alkali in a fused state, substantially as described.

In testimony whereof I have hereunto set my hand in the presence of two subscribing witnesses.

HENRY S. BLACKMORE.

Witnesses:
J. VAN SANTVOORD,
E. F. KASTENHUBER.